UNITED STATES PATENT OFFICE.

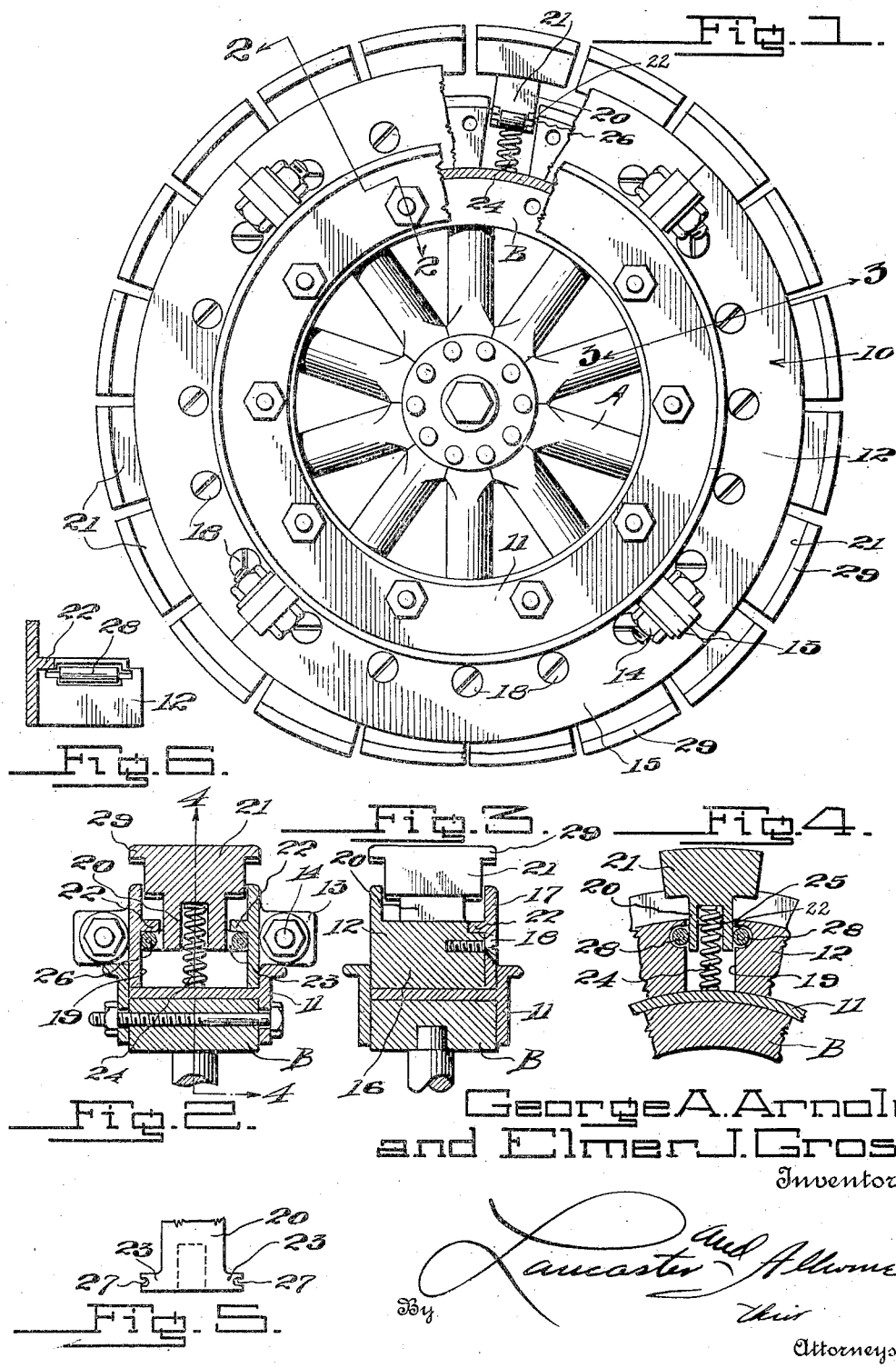

GEORGE A. ARNOLD, OF IRWIN, AND ELMER J. GROSS, OF TRAFFORD, PENNSYLVANIA.

RESILIENT TIRE.

1,346,155.  Specification of Letters Patent.  Patented July 13, 1920.

Application filed June 10, 1919. Serial No. 303,022.

*To all whom it may concern:*

Be it known that we, GEORGE A. ARNOLD and ELMER J. GROSS, citizens of the United States, residing at Irwin and Trafford, Westmoreland county, State of Pennsylvania, respectively, have invented certain new and useful Improvements in Resilient Tires, of which the following is a specification.

This invention relates to resilient tires, particularly adapted for use upon motor vehicles, such as trucks, tractors or the like, but applicable for use on pleasure vehicles, which resilient tire structure overcomes the inconveniences contingent with the use of pneumatic tires, and is interchangeable with the solid cushion tires of truck wheels in the present construction of the rims of the wheels of motor vehicles, thereby permitting the removal of an unsatisfactory or worn out cushion tire and the replacing of it by one of the improved resilient tire structures in which the tread structures are constructed of metal to increase the longevity of the tire as well as the augmented tractive proclivity thereof.

A further object of this invention is to provide, in a resilient tire structure, a retaining portion for attachment to the wheel rim which carries a plurality of radially movable resiliently mounted tread members having their facing ends spaced, in such manner as to permit inward radial depression of the tread members without interference of one with the other, and also to provide a plurality of roller bearings rotatably carried by the carrying portion of the tire structure and engaging sides of each of the resiliently mounted tread members, and also to provide roller bearings rotatably supported upon the inner ends of the radially movable resiliently supported tread members and engaging side walls of the recesses in the carrying sections which receive the inner ends of the tread members, for decreasing friction and consequently permitting free relative movement of the tread members under action of the wheel.

Other objects of the invention will appear in the following detailed description taken in connection with the accompanying drawings, forming a part of this specification, and in which drawings:

Figure 1 is a side elevation of a vehicle wheel equipped with the improved resilient tire structure showing parts of the same broken away.

Fig. 2 is a cross-section through the tire taken on the line 2—2 of Fig. 1.

Fig. 3 is a cross-section through the tire taken on the line 3—3 of Fig. 1.

Fig. 4 is a fragmentary section through the tire structure taken on the line 4—4 of Fig. 2.

Fig. 5 is a detail view illustrating in side elevation the inner end of one of the resiliently mounted radially movable tread members, and Fig. 6 is a detail section through the carrying section of the tire illustrating the manner of supporting the tread member engaging roller bearings.

Referring more particularly to the drawings, A indicates any approved type of vehicle wheel having a felly or rim B.

The improved resilient tire structure generically indicated by the numeral 10 is applicable for mounting upon the rim structure 11 of the wheel A, which rim structure, is of the approved demountable type now commonly in use upon truck wheels.

The resilient tire structure comprises a carrying rim 12 formed of a plurality of sections having their facing ends connected through the medium of laterally extending ears 13 and bolts 14, for properly maintaining the sections upon the wheel rim 11. Each of the sections 15 of the carrying portion 12 of the tire structure comprises a main body section 16 to one edge of which a confining flange 17 is attached by means of screws or analogous fastening devices 18. The main body sections 16 are provided with a plurality of spaced recesses 19 which receive therein the shanks 20 of the tread members 21. The main body 12 and the plate 17 have inwardly extending ribs 22 formed thereupon which are adapted to engage against the outer surfaces of lateral extensions 23 formed upon the inner end of the shanks 20 to limit the outward movement of the tread members 21 under the expanding action of the spiral springs 24. These springs 24 engage in centrally disposed recesses 25 in the shank 20 and normally urge the tread members 21 outwardly yieldably supporting these members for inward radial movement under the weight of the vehicle upon which the wheel A is mounted. To reduce friction, which might be occasioned by the sliding movement of the tread members 21, bearing rollers 26 are carried by the lateral extensions 23, the pintle of the bearing rollers feeding in notches or recesses 27 formed in the ends of the extensions 23, and bearing rollers 28 are rotatably carried by the main body structure 12, and engage along the sides of the shanks 20 oppositely to the sides which carry the rollers 26. The rollers 28 are embedded in recesses formed in the main body 12 and project into the recesses 19 sufficiently to engage the shanks 20 upon the inward movement of the treads 21.

The tread members 21 have laterally extending flanges 29 along their side edges which are adapted for engagement with the projecting flanges formed upon the outer edges of the main body 12 and the plates 17.

A plurality of the tread members 21 are provided, as clearly shown in Fig. 1 of the drawings, each being applicable for independent movement radially of the center of the wheel A and their facing ends are spaced sufficient distance to permit the movement of adjacent tread members inwardly to the limit of their movement without contact one with another.

Changes in detail may be made without departing from the spirit of this invention, but

We claim:

1. In a resilient tire, the combination of a carrying portion adapted for attachment to a wheel rim, composed of a plurality of detachably connected sections, said sections each including a body portion and a confining plate, the body portion provided with recesses opening out at one side thereof, the confining plates being attached to the body portions and closing the open sides of the recesses, a plurality of radially movable tread members provided with shanks extending into said recesses, springs engaging said tread members and normally urging them outwardly, ribs carried by said confining plates and said body portions for limiting the outward radial movement of the tread members, lateral extensions formed upon the inner ends of the shanks for engaging the ribs, bearing rollers carried by said extensions engaging the opposite side walls of the recesses in the carrying portion, bearing rollers carried by said carrying portion and engaging the sides of the shanks opposite to the sides which carry said extensions.

2. In a resilient tire, the combination, of a carrying portion adapted for attachment to a wheel rim composed of a plurality of detachably connected sections, said sections each including a body portion and a confining plate, the body portion provided with recesses therein opening out at one side thereof, the confining plate being attached to the body portion and closing the open sides of the recesses, a plurality of radially movable tread members provided with shanks extending into said recesses, springs engaging said tread members and normally urging them outwardly, ribs carried by said confining plates and said body portions for limiting the outward radial movement of the tread members, lateral extensions formed upon the inner ends of said shanks, bearing rollers carried by said extensions engaging the opposite side walls of the recesses in the carrying portion, bearing rollers carried by said carrying portion and engaging the sides of said shanks oppositely to the sides which carry said extensions, and lateral flanges formed upon the outer ends of said tread members and overhanging the outer edges of said carrying portion.

GEORGE A. ARNOLD.
ELMER J. GROSS.